US009082386B1

(12) United States Patent
Cohen

(10) Patent No.: US 9,082,386 B1
(45) Date of Patent: Jul. 14, 2015

(54) TWO DIMENSIONAL MUSICAL KEYBOARD

(71) Applicant: Lewis Neal Cohen, San Diego, CA (US)

(72) Inventor: Lewis Neal Cohen, San Diego, CA (US)

( * ) Notice: Subject to any disclaimer, the term of this patent is extended or adjusted under 35 U.S.C. 154(b) by 0 days.

(21) Appl. No.: 14/146,709

(22) Filed: Jan. 2, 2014

Related U.S. Application Data

(60) Provisional application No. 61/751,861, filed on Jan. 12, 2013.

(51) Int. Cl.
| *G10C 3/12* | (2006.01) |
| *G09B 15/02* | (2006.01) |
| *G10H 1/00* | (2006.01) |
| *G10H 1/32* | (2006.01) |
| *G10H 1/34* | (2006.01) |
| *G10H 1/38* | (2006.01) |

(52) U.S. Cl.
CPC .................. *G10H 1/34* (2013.01); *G09B 15/02* (2013.01); *G09B 15/023* (2013.01); *G10C 3/12* (2013.01); *G10H 1/00* (2013.01); *G10H 1/38* (2013.01)

(58) Field of Classification Search
CPC ........ G10C 3/12; G09B 15/023; G09B 15/02; G10H 1/00; G10H 1/34; G10H 1/38
USPC .............. 84/433, 423 R, 423 B, 615, 74, 744, 84/483.2
See application file for complete search history.

(56) References Cited

U.S. PATENT DOCUMENTS

| 3,342,094 | A | * | 9/1967 | Wilson | 84/423 R |
| 3,417,648 | A | * | 12/1968 | Honig | 84/423 R |
| 3,468,209 | A | * | 9/1969 | Barreto | 84/423 R |
| 3,973,460 | A | * | 8/1976 | Coles | 84/678 |
| 4,031,800 | A | * | 6/1977 | Thompson | 84/423 R |
| 5,088,378 | A | * | 2/1992 | DeLaTorre | 84/470 R |
| 5,323,679 | A | * | 6/1994 | Riday | 84/423 R |
| 5,404,788 | A | * | 4/1995 | Frix | 84/423 R |
| D367,858 | S | * | 3/1996 | Bertram et al. | D14/456 |
| D371,352 | S | * | 7/1996 | Bertram et al. | D14/395 |
| 5,726,374 | A | * | 3/1998 | Vandervoort | 84/638 |
| 5,741,990 | A | * | 4/1998 | Davies | 84/423 R |
| 5,900,571 | A | * | 5/1999 | Partovi | 84/722 |
| 6,093,879 | A | * | 7/2000 | Pye | 84/451 |
| 6,392,131 | B2 | * | 5/2002 | Boyer | 84/424 |
| 6,444,888 | B1 | * | 9/2002 | VanDruff | 84/609 |
| 6,501,011 | B2 | * | 12/2002 | Wesley | 84/719 |
| 6,605,767 | B2 | * | 8/2003 | Fiks et al. | 84/423 R |
| 6,670,535 | B2 | * | 12/2003 | Anderson et al. | 84/443 |
| 7,273,979 | B2 | * | 9/2007 | Christensen | 84/615 |
| 7,982,115 | B2 | * | 7/2011 | Johnston | 84/483.2 |
| 8,173,884 | B2 | * | 5/2012 | Gatzsche et al. | 84/615 |
| 8,426,716 | B2 | * | 4/2013 | Little et al. | 84/613 |
| 8,558,723 | B2 | * | 10/2013 | Robinson et al. | 341/23 |
| 8,822,803 | B2 | * | 9/2014 | Terry | 84/644 |
| 8,835,738 | B2 | * | 9/2014 | Little et al. | 84/613 |
| 8,912,418 | B1 | * | 12/2014 | Cohen | 84/483.2 |

(Continued)

*Primary Examiner* — David Warren
*Assistant Examiner* — Christina Schreiber

(57) ABSTRACT

A musical keyboard comprises one or more handboards, where each handboard has a two dimensional arrangement of keys. The columns are formed by an octave of conventional piano keys. The rows are formed by subdividing the conventional piano keys. First the keys are subdivided into a front key area with wide white keys and optionally thin extensions of the black keys, and a rear key area with white and black keys. The front and rear key areas are each further subdivided into rows of octaves. Two octaves of a note can be played with the same finger, and a hand can span a three octave range.

16 Claims, 6 Drawing Sheets

(56) References Cited

U.S. PATENT DOCUMENTS

2002/0073826 A1* 6/2002 Fiks et al. .................. 84/477 R
2007/0022868 A1* 2/2007 Nishibori et al. ............... 84/626
2008/0141849 A1* 6/2008 Johnston ..................... 84/483.2
2009/0114078 A1* 5/2009 Plamondon ................. 84/423 R

* cited by examiner

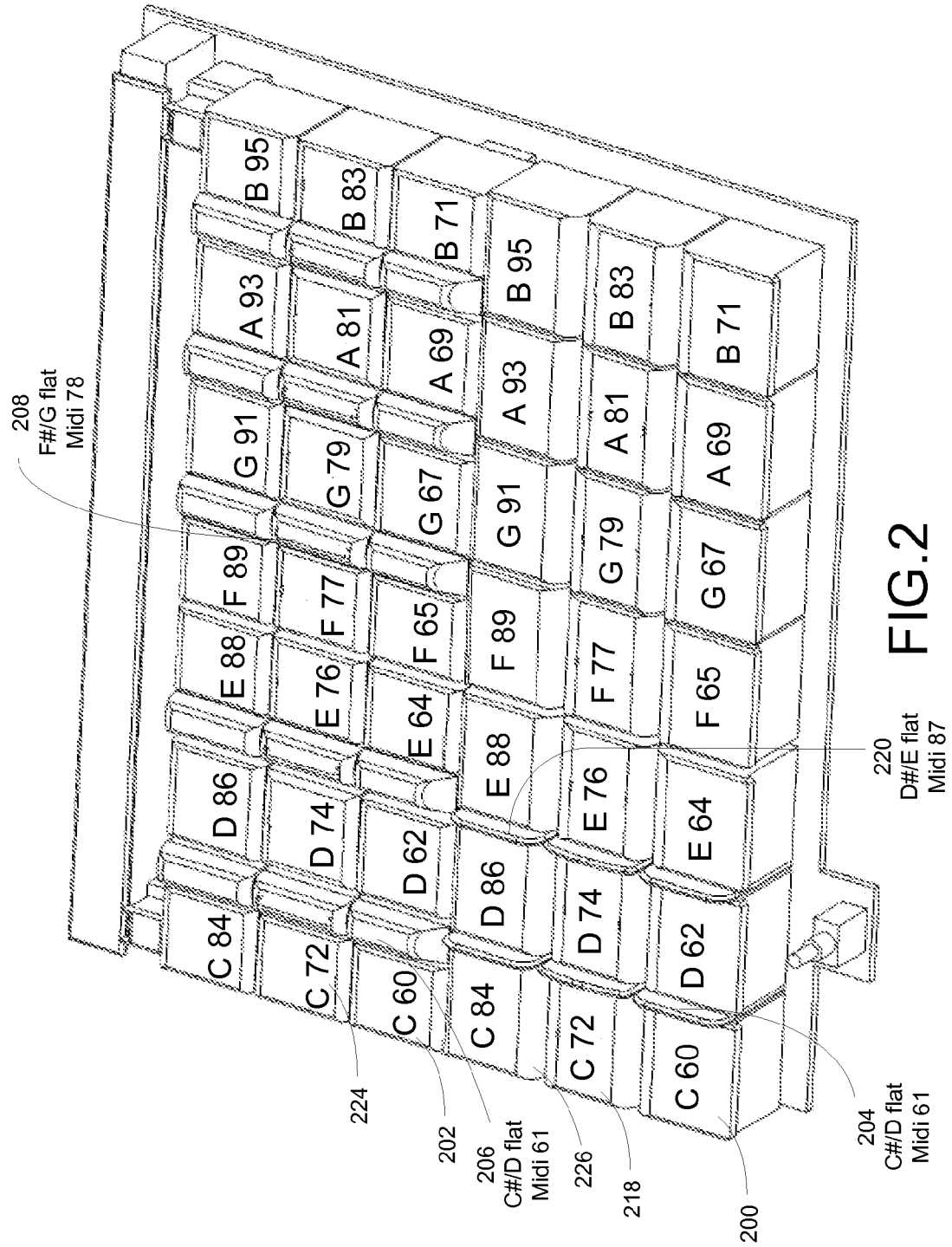

TWO DIMENSIONAL MUSICAL KEYBOARD

CROSS-REFERENCE TO RELATED APPLICATIONS

This application claims the benefit of provisional patent application Ser. No. 61/751,861 filed by the present inventor on Jan. 12, 2013.

FEDERALLY SPONSORED RESEARCH

Not Applicable

SEQUENCE LISTING OR PROGRAM

Not Applicable

BACKGROUND OF THE INVENTION

1. Field

This invention generally relates to music, specifically to an improved musical keyboard.

2. Background

A conventional piano keyboard arranges keys linearly from left to right. The front key area of a piano keyboard contains only the wide front parts of the white keys. In the front key area the seven notes of the C major scale (C,D,E,F,G,A, and B) are repeated for each successive octave. The rear key area of a piano keyboard contains the narrow rear parts of the white keys with the raised black keys interleaved. In the rear key area the 12 notes of the chromatic scale (C,C#,D,D#,E,F,F#, G,G#,A,A#, and B) are repeated for each successive octave. There are two pairs of white keys (B to C and E to F) that are separated by a half step (semitone) rather than a whole step (whole tone). These keys don't have a black key interleaved between them. This gives rise to the familiar visual and tactile octave landmark system of the piano, with each octave containing two groups: a group of two black keys interleaved between three white keys, and a group of three black keys interleaved between four white keys.

A conventional piano keyboard does not make efficient use of key area. The front key area is well situated to be played by the thumb. The rear key area is well situated to be played by the other four fingers. Both the front and rear key areas are much longer front to back than the actual surface area of the contact between a finger and a key. The large key area and linear arrangement of keys makes even an electronic piano keyboard large and bulky. Specialized furniture or stands are needed to locate a piano keyboard in convenient relation to a computer. A conventional electronic piano keyboard cannot be played on a user's lap, or while seated in a car or plane. Flexible portable keyboards, that roll up when not in use, are commercially available, but these still require a large flat surface while they are in use. In live performance, a keyboard is generally placed on a stand. This prevents the musician from moving around the stage and interacting with the audience.

The conventional music notation system does not provide a simple method of finding which key to play on a piano keyboard. White spaces and black lines do not correspond to white and black keys. Furthermore, because it is one-dimensional, a piano keyboard is not well suited for display as a graphic on a tablet computer, cell phone, or computer monitor with a rectangular aspect ratio.

It is desirable to concentrate visual attention on the sheet music, and play by touch alone. It is difficult to play the piano by touch. A typical hand spans from one to two octaves. While playing a conventional piano, each hand is moved freely from left to right, to span the set of notes currently being played, as well as those in the immediate future. The position of the hand over the octave landmark system is random, and continuously changing, causing confusion. Furthermore, the thumb is usually positioned in the front key area, where there are only white keys, thus it is difficult to establish a reference position using the thumb. A musical keyboard that minimizes changes in hand position, analogous to a typewriter keyboard, would be advantageous.

It is common to find adjacent octaves being played simultaneously in piano music. On a conventional piano this requires the use of two fingers, the thumb and pinky. It can be difficult to play fast passages where there is movement between white and black keys in octaves. Children and people with small hands can also find the stretch uncomfortable.

It is desirable for a keyboard synthesizer to be able to emulate other instruments, such as the guitar. In order to accurately capture the strumming and picking effects used by guitarists, it would be useful to connect a strumming device to a keyboard, and finger the notes with one hand, while strumming with the other hand. Common guitar chords cover a range of up to three octaves. These chords cannot be played using only one hand on a piano keyboard.

BRIEF SUMMARY OF THE INVENTION

The keyboard of the present invention comprises one or more handboards, where each handboard has a two dimensional arrangement of keys. The columns are typically formed by an octave of conventional piano keys. The rows are formed by subdividing the conventional piano keys. First the keys are subdivided into a front key area with wide white keys and optionally thin extensions of the black keys, and a rear key area with white and black keys resembling the rear key area of a conventional piano keyboard. The front and rear key areas are then further subdivided into rows of octaves. Each row of octaves is typically duplicated in the front and rear key areas, to allow a musician to comfortably use his thumb or other finger to press a given key. By pressing at the boundary between two keys in a column, the musician can play two octaves of a note with one finger.

Various additional aspects, features, and functions are described below in conjunction with the appended Drawings.

BRIEF DESCRIPTION OF THE DRAWINGS

FIG. 2: Perspective view of a right handboard of the present keyboard invention, showing note assignments

DETAILED DESCRIPTION

Figure 1:
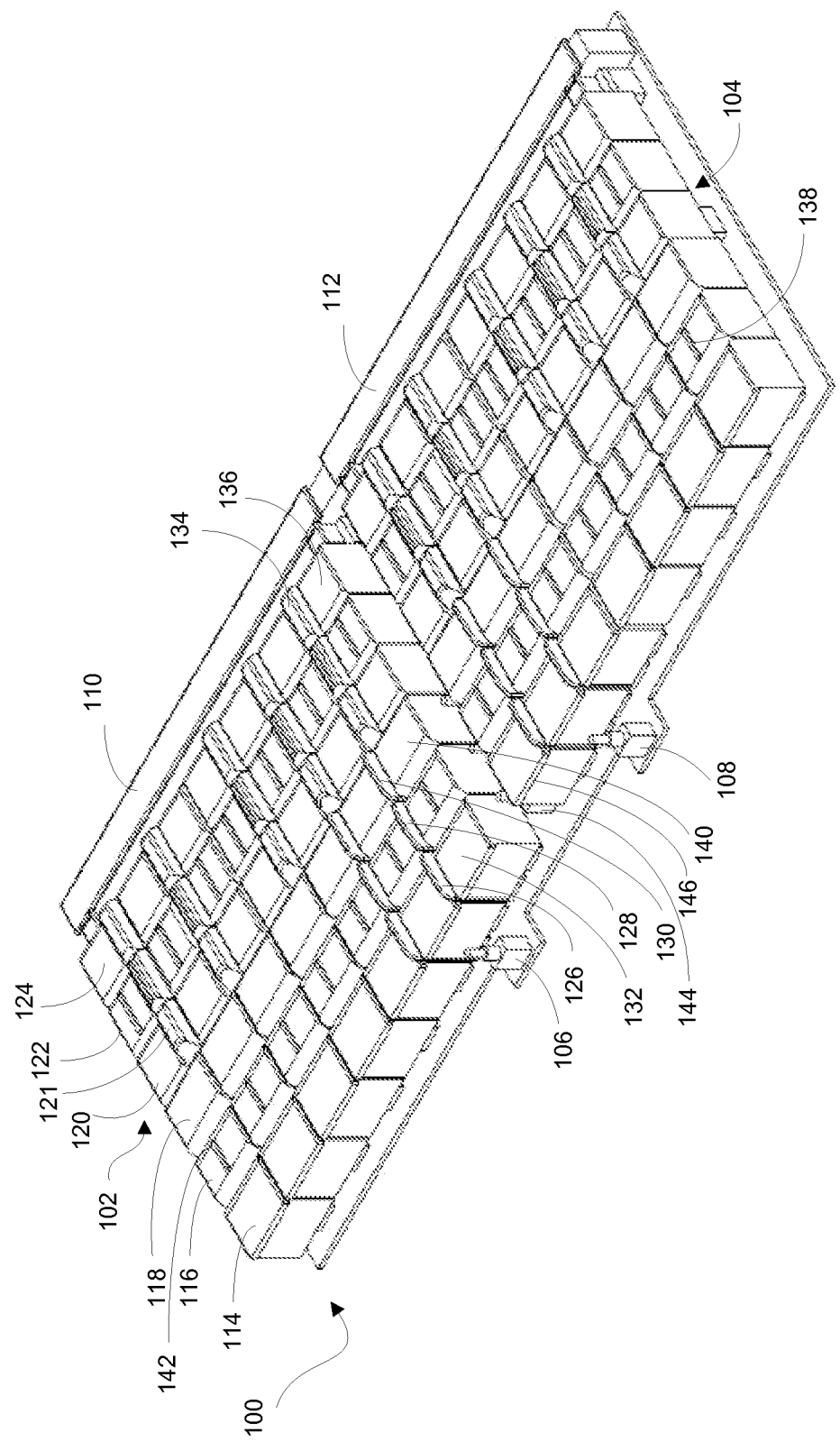
FIG. 1: Perspective view of a two handboard keyboard embodiment of the present keyboard invention

An embodiment of the keyboard of the present invention is illustrated in FIG. 1. A two hand keyboard assembly 100 is comprised of a left handboard 102 and a right handboard 104. Left handboard 102 has a front key area, whose front left corner is the first key in the front row 114, which is nominally tuned to "C" in the diatonic C major scale. The rear right corner of the front key area of left handboard 102 is the last key in the rear row 140, which is nominally tuned to "B". Left handboard 102 has a rear key area, whose front left corner is the first key in the front row 120, which is nominally tuned to "C". The rear right corner of the rear key area of left handboard 102 is the last key in the rear row 136, which is nominally tuned to "B". A first key in the middle row of the front key area 116, has a rib or tactile guide 142 molded, fastened, or carved into its top surface. Other keys in the middle row of both the front and rear key areas have tactile guides, for example key 138 on the right handboard. The tactile guides on keys in the middle row allow the musician to find the correct row of octaves without looking at the keyboard. An embodiment of a three octave handboard has dimensions that are chosen such that the player can simultaneously depress key 132 with his left hand thumb and key 124 with his left hand pinky. In one embodiment of a three octave handboard, a column of keys should be roughly the same size as its equivalent piano key. Referring to FIG. 1, tops of keys 114,116,118, 120,122,124 should have the same combined dimensions as a C key on a conventional piano. Other dimensions can be used, depending on the number of rows and the size of the player's hand. In an alternate embodiment, there are more than three rows of octaves, to allow the player to access the whole range of an instrument, for example the guitar. An alternate embodiment may include more than one octave of keys in a row, to facilitate different fingerings. There may also be a gap between the front and rear key areas, to accommodate the longer thumb to finger spacing of players with large hands. Either the front or rear key area may be slightly raised to allow distinguishing one area from the other by touch alone.

In the rear key area, there are white keys, for example the last key of the rear row 136 ("B"), and there are raised black keys, for example the $2^{nd}$ to last key of the rear row 134 ("A#/B flat"). In the front key area there are wide white keys, for example key 114 ("C"), and there are narrow raised black keys, for example key 126 (A#/B flat"). In one embodiment, the narrow raised black keys in the front key area are only approximately 0.05 inches wide, to allow a thumb to fit in between them comfortably when actuating the wide white keys. In one embodiment of a left handboard, only those black keys which are close to the thumb, G#/A flat and A#/B flat, are present in the front key area. Alternate embodiments may choose not to include the black keys in the front key area, or include any combination of black keys. Alternate embodiments may choose other colors besides black and white for any of the keys for learning or aesthetic purposes. One embodiment of my keyboard changes the color of the raised keys in the front key area to white, to maintain the appearance of a conventional piano keyboard. An alternate embodiment may include one or more handboards combined with a strummer, wind controller, or other note actuation and articulation device, to emulate a guitar, saxophone, or other conventional instrument.

The left handboard has an octave up switch actuator 110, at the rear of the handboard, and an octave down switch 106. The right handboard has an octave up switch actuator 112, at the rear of the handboard, and an octave down switch 108. In one embodiment, there is a small gap between the left and right handboard. One or more general purpose switches 144 are located in the gap, where the switches can be accessed by the thumb or fingers of both hands. These switches can be used to signal page turns to a music notation display device, to put an instrument into master tuning mode, to select sounds, or for any other purpose.

FIG. 2 shows a right handboard overlaid with note names and MIDI note numbers. The MIDI note numbers are shown to distinguish which octave of a particular note will be played. If a note has MIDI note number N, a note one semitone higher will have MIDI note number N+1, and a note an ocave higher will have MIDI note number N+12. The present invention is not limited to using MIDI or any particular digital music protocol. In one embodiment, all the white keys in a given row of the front key area have duplicates on the same subdivided piano key in the corresponding row of the rear key area. The note C (midi note 60) appears in two places, and can be played on key 200 with the right thumb or key 202 with the right index finger. In a similar manner, note C#/D flat (midi note 61) is duplicated, and can be played on narrow black key 204 with the right thumb or key 206 with the right index finger. Although the width of a key in the front key area can be different than the width of its duplicate key in the rear key area, and although some black keys may not be present in the front key area, duplicate keys are the to be in the same column. Narrow raised key 220 is a duplicate in the front key area of the D sharp/E flat black key in the rear row of the rear key area. The narrow raised keys also provide tactile feedback to the thumb in the front key area. The duplication of notes ensures that a comfortable fingering can be found for most musical phrases. Key 208 F sharp/G flat, and black keys to the right of it, are not duplicated in the front key area. That is because on a right handboard, the thumb will not typically play notes on the right side. A key in the front key area and its duplicate key in the rear key area select pitches in the musical interval of a unison, meaning the same pitch, in the same manner that pressing a conventional piano key anywhere along its length produces the same pitch.

A chamfer, gap, or beveled edge 226 on the front of a key provides tactile feedback to a user that her finger is crossing the gap between two octaves of the same note.

OPERATION OF INVENTION

Referring to FIG. 1 and FIG. 2, keyboard 100 is operated by placing the left hand over left handboard 102, and placing the right hand over right handboard 104. In accordance with the song to be performed, the player depresses keys in the front key area of the right or left handboard with his right or left thumb, and depresses keys in the rear key area of the right or left handboard with the other four fingers of his right or left hand, respectively. There may arise occasions where the player uses both hands on a single handboard, or plays the rear key area with his thumb, or uses an object other than his fingers to press the keys. These techniques are still in accordance with the present invention. The keys are connected to mechanical, dome, or membrane switches in the same manner as keys on a computer keyboard.

By pressing the thumb along chamfer 226, the musician can actuate two octaves of the same note (C midi 84 and C midi 72 on key 218). Two octaves (C midi 60 and C midi note 72) can also be played by the index finger pressing the chamfer between key 202 and key 224. In this manner any one finger can produce two notes, an octave apart, if they are in the tuning range of a handboard.

Those skilled in the art will appreciate that in the manner of a conventional electronic keyboard, each individual key, for example key 200, can have two sets of switch contacts arranged vertically so that the velocity of the finger striking the key can be determined and used to select the volume and timbre of a note.

In one embodiment, both handboards are tuned to the same note, but different octave ranges. For example the left handboard 102 key 114 could be tuned to C (midi note 36) and the right handboard key 146 could be tuned to C (midi note 60). In this case the highest note on the left handboard would be B (midi note 71). The notes in the octave from C (midi note 60) to B (midi note 71) would be present on both handboards. Based on the musical score, or personal preference, the player could use either hand to play these notes. The two hand keyboard would play a note whenever it was actuated by either hand. The overlap in notes is important to allow the fingering to closely match piano fingering, where the hands move freely left and right, rather than setting a fixed boundary. During performance, it is sometimes necessary to shift the tuning of a handboard up or down an octave, to allow access to the highest or lowest notes available on a conventional piano keyboard. To tune the right handboard up an octave, the octave up actuator 112 is pressed. At this point in time, all keys on the right handboard are redefined an octave higher. Notes that are already sounding remain at their current pitch until released. The octave down switch 108 causes the right handboard to be tuned down an octave. In one embodiment, each handboard has its own octave up and down switch, and octave changes remain in effect until the next octave up or down switch actuation. Other embodiments might use a pedal, or might have octave changes implemented as a transient event that only lasts as long as a switch or pedal is held down.

In addition to changing the octave tuning of each handboard independently, a two hand keyboard supports a master tuning operation where the lowest sounding or root key 114 can be tuned to a note other than C. General purpose switch 144 can be used to initiate the master tuning operation. After switch 144 is pressed, the keyboard can enter a waiting mode where the next key pressed defines the note which should be assigned to root key 114. If the next key pressed was a "D", then key 114 would be a D, and key 121 would be a D#/E flat. There are many other ways to effect a change in the master tuning of the keyboard. The preferred embodiment of the present invention should be construed as a keyboard where all pitches are assigned relatively, to maintain the same interval relationships between keys as those shown in FIG. 2, regardless of the starting pitch of root key 114.

Figure 5:
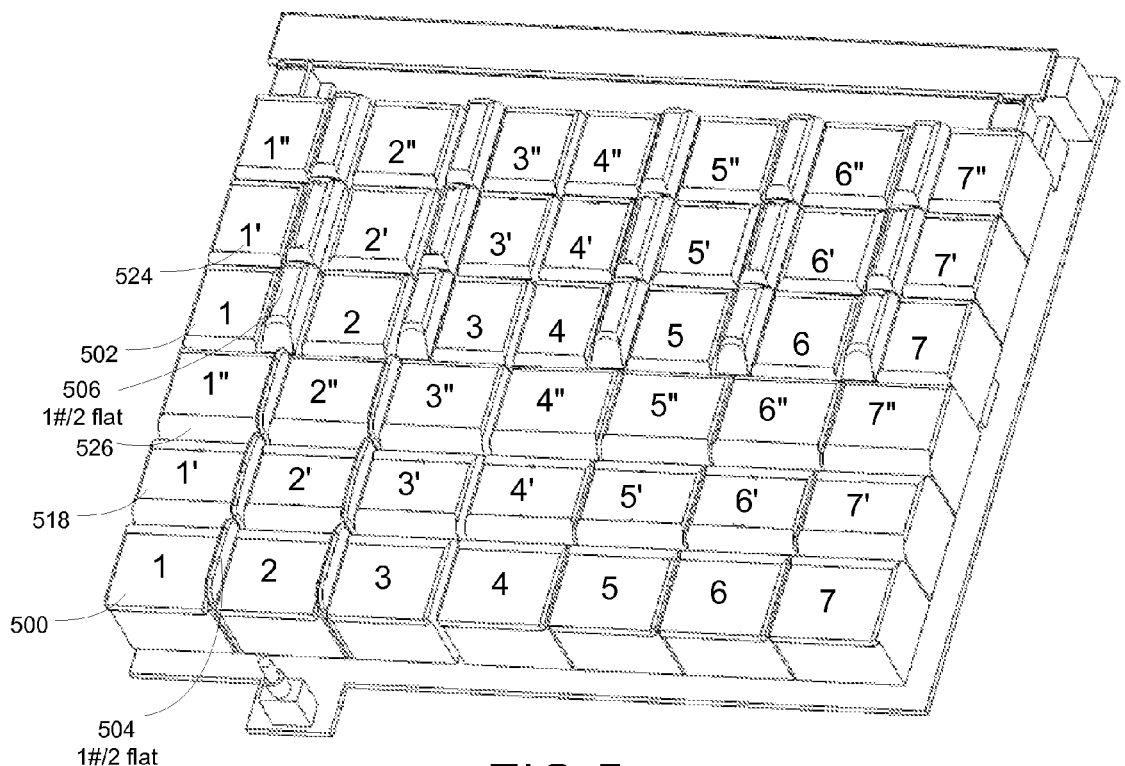
FIG. 5: Right Handboard of the present invention, showing scale degree of note assignments

FIG. 5 shows a right handboard with each key labeled with the scale degree of its note in the major scale whose root is assigned to root key 500. Key 500 (and its duplicate key 502) is marked "1" to indicate it is the root of the major scale. The black key notes can similarly be labeled with reference to the major scale. Key 504, and its duplicate 506, can be labeled "1 sharp/2 flat". A single quote mark is used to indicate a note in the second row is one octave higher than the note in the same column of the first row. A double quote mark is used to indicate a note in the third row is two octaves higher than the note in the same column of the first row. Accordingly, key 518 (and its duplicate key 524) represents a pitch one octave higher than root key 500. And key 526 represents a pitch two octaves higher than root key 500. It can be seen from FIG. 5 that three octaves of a particular scale degree are in the same column, whereas they would be separated and interleaved among fourteen white keys on a conventional piano. This grouping by octaves is valuable for teaching music theory, and for teaching melodies and chords in terms of scale degrees. It could also be used for the Solfege method of vocal instruction, which assigns syllables to scale degrees (ex. Do for one, Re for two etc.). Other graphic symbols could be used instead of the single and double quotes to indicate which octave a note belongs to. In one embodiment the root key 500 is always tuned to C, allowing the fingering of a song to most closely match that of a conventional piano keyboard. In another embodiment, the root key 500 is tuned to the root of the musical key of the song to be played, allowing the scale degree of each note in the song to be determined most easily learning purposes, and resulting in the easiest fingering for songs in a major scale.

Figure 4:
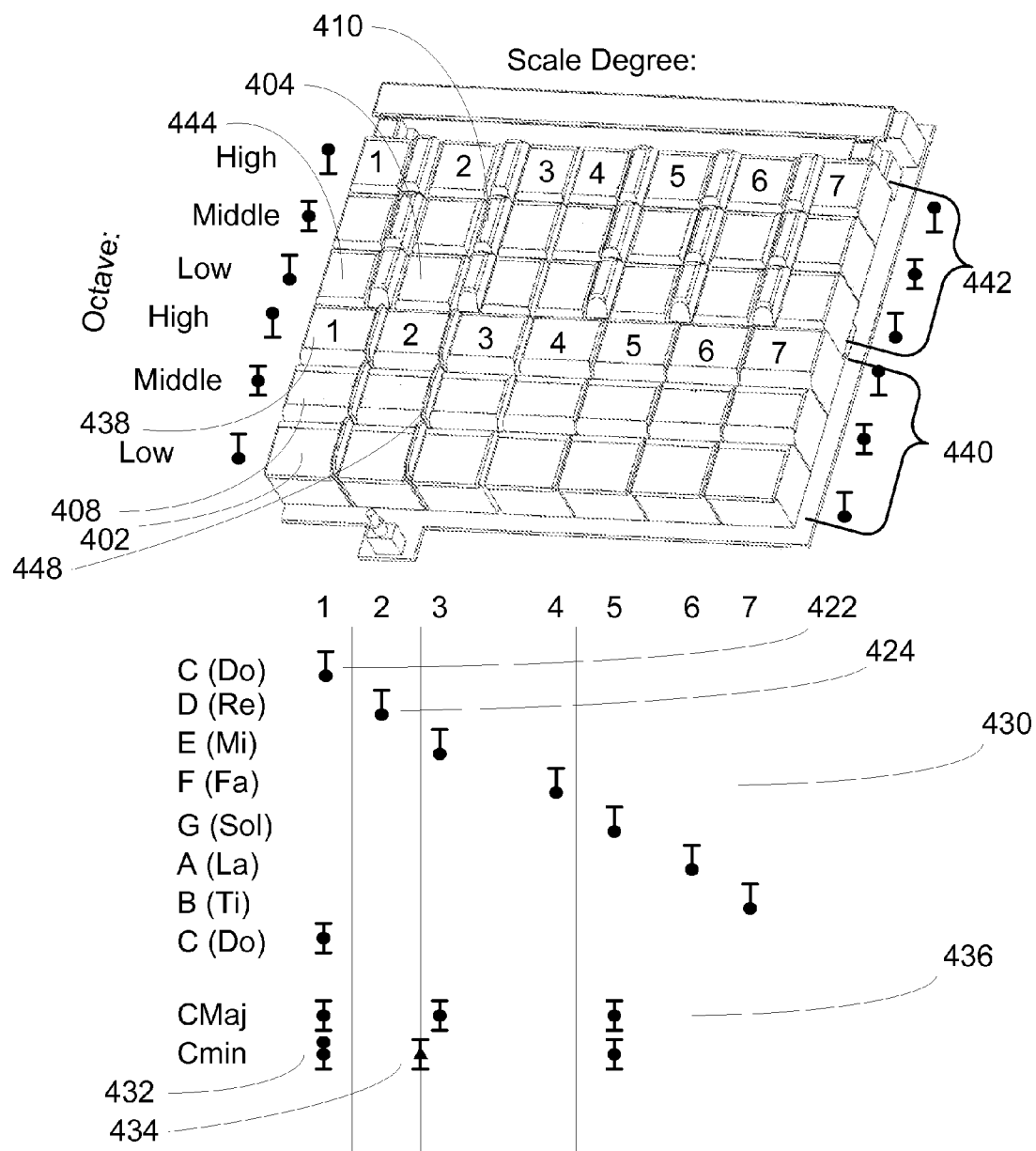
FIG. 4: Mapping between single notation staff and Right Handboard of the present invention

FIG. 4 shows my notation system in relation to a right handboard, divided into a front key area 440, and a rear key area 442. In this notation system, a five line staff is used to represent each handboard. A vertical staff line 430 represents a column of black keys. The particular vertical staff line indicated by 430 represents the black keys with scale degree 6 sharp or 7 flat, or A sharp, B flat, for a handboard with root key 402 tuned to C. A space is defined as the white area to the left or right of a staff line. Each space represents a column of white keys. A space 424 between the first and second staff lines, counting from left to right, indicates the column of white keys tuned to the second scale degree, or D, for a handboard with root key 402 tuned to C.

Figure 3A:
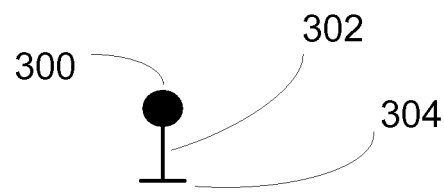
FIG. 3: Note-Octave Symbol graphical construction in a music notation system for use with the present invention
Figure 3B:
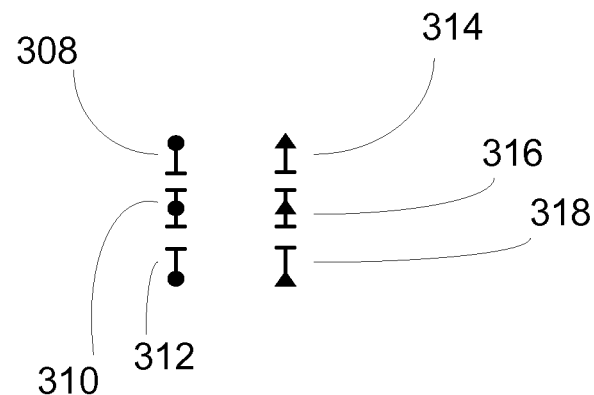
Figure 3C:
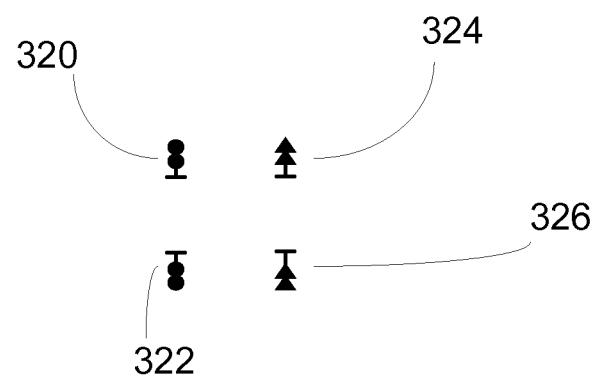

FIG. 3 shows the parts of a note-octave symbol, used for designating actuation of one or more octaves of a given note or scale degree. Referring to FIG. 3A, each note-octave symbol has a short vertical line or note stem 302. A round filled circle or round note head 300 is placed in one of three possible locations along note stem 302. The placement of the note head indicates which octave should be actuated. A "note on" or note actuation occurs when the key indicated by the notation is pressed. FIG. 3B shows some note on events for a three octave handboard. A note on for the highest octave or rear row 308 has the note head 300 at the top of the note stem 302. A tail or note alignment mark 304 is placed at the bottom of the note stem 302 to give a visual reference for determining the position of the note head. In the case of a note on for the lowest octave or front row 312, the note alignment mark is at the top of the note stem. In the case of a note on for the middle octave 310, note alignment marks are placed at either end of the note stem. A distinctive triangular note head is used to indicate notes corresponding to black keys, which fall on a staff line. FIG. 3B shows a note on symbol for the highest octave 314, middle octave 316, and lowest octave 318 of a black key. If two or three octaves of a note must be struck simultaneously, this is indicated by adding more than one note head to the note stem. FIG. 3C shows some common examples. A note-octave symbol showing the middle and high octaves is shown for a white key in 320, and for a black key in 324. A note-octave symbol showing the middle and low octaves is shown for a white key 322, and for a black key 326. Alternate embodiments with note-octave symbols indicating note actuations in more than three octaves are possible.

Returning to FIG. 4, note-octave symbol 422 designates the low octave of the first scale degree key 402 or 444. Symbol 424 designates the low octave of the second scale degree key 404 or 446. Symbol 434 designates the middle octave of the sharp second or flat third scale degree key 410 or 448. Similarly, note-octave symbol 432 indicates the middle and high octave of the first scale degree keys 408 and 438, or their duplicates in the rear key area, should be pressed. Time is shown vertically, with a horizontal row in the notation indicating simultaneous actuation of notes. A C major chord is shown in 436, with the C,E, and G (scale degrees 1,3, and 5) of the middle octave played simultaneously.

Figure 6:
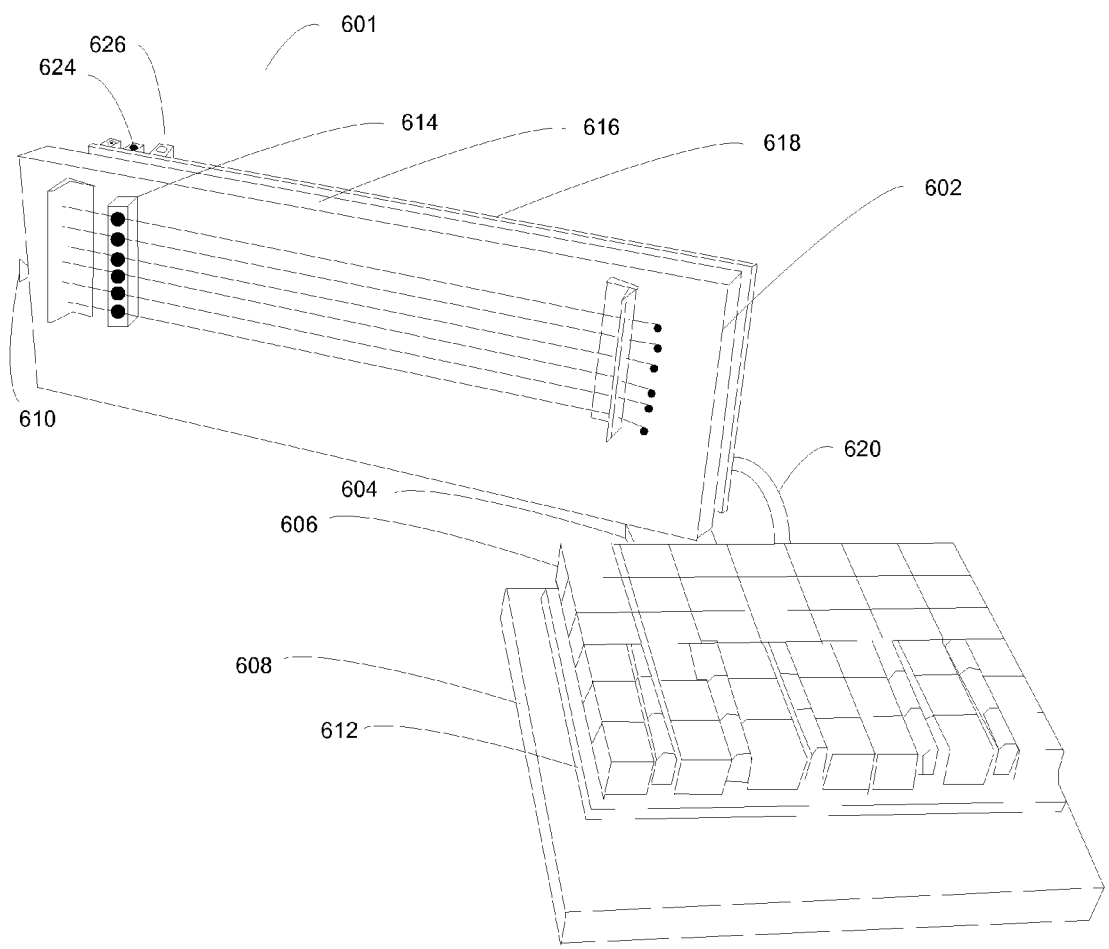
FIG. 6: Perspective view of an electronic musical instrument consisting of a Left Handboard of the present invention attached to a strummer

FIG. 6 shows an electronic instrument with a left handboard of the present keyboard invention joined to a strummer 602, called a keyboard strummer instrument 601. Handboard 612 is mounted to handboard base plate 608, which is approximately 7.5" wide by 6.5" deep. Rectangular tube 604 is attached to handboard base plate 608 on one end, and to strummer base plate 616, which is approximately 12" long by 6" high, on the other. The instrument is typically played on a strap (fastened to strap button 610) or on the musician's lap, with the top surfaces of the keys parallel to the floor. The plane of the strings will typically be perpendicular to the floor, but may be leaned back to allow the musician to see the individual strings.

The string vibrations are sensed by transducer 614, and converted to electrical signals indicating actuation of a particular string, but not pitch. Electrical signals indicating which keys are selected are transmitted on cable 620. A processor on printed circuit board 618, makes an association between selected keys, for example key 606, and actuated strings to select the pitches of notes that will sound. The user can listen by plugging headphones into jack 624. The user can connect the keyboard strummer instrument to a computer or other display device via USB connector 626.

In one variant of the invention, keys may have other colors than black and white. Keys may be colorized by row, using color to indicate octave, for teaching purposes. Other tactile features may be used to distinguish certain keys, for example rough or smooth top surfaces. In another embodiment, to conserve space, two handboards may be located side by side, with no space in between. In another embodiment the rows of octaves could be reversed such that the lowest sounding notes are located at the back of a key area.

The compact two dimensional layout of the keyboard invention makes it particularly well suited to implementation on a touchscreen device. In this case, mechanical keys are replaced by key regions displayed on the touchscreen. A music learning system can be achieved by simultaneously displaying the music notation and keyboard of the present invention. The touchscreen software may be written to enable pitch bend, vibrato, or other musical effects by dragging or slightly varying finger position from one key to an adjacent key.

In one embodiment, an instrument using my keyboard is paired with a display device showing music notation, to create a music learning or gaming system, with real time feedback.

It will be readily appreciated by those skilled in the art that various modifications of the present invention may be devised without departing from the essential concept of the invention, and all such modifications are intended to come within the scope of the present invention and the claims appended hereto. It is to be especially understood that the invention is not intended to be limited to illustrated embodiments, and that the substitution of a variant of a claimed element or feature, without any substantial resultant change in the working of the invention, will not constitute a departure from the scope of the invention. In this patent document, the word "comprising" is used in its non-limiting sense to mean that items following that word are included, but items not specifically mentioned are not excluded. A reference to an element by the indefinite article "a" does not exclude the possibility that more than one of the element is present, unless the context clearly requires that there be one and only one such element.

I claim:

1. A keyboard for controlling musical notes, comprising:
    a plurality of keys arranged in at least one row and a plurality of columns in a front key area;
    a plurality of keys arranged in at least one row and a plurality of columns in a rear key area;
    a row of keys in the front key area comprising keys in a first group and zero or more keys in a second group, wherein the top playing surfaces of the keys in the second group, if present, are raised above the top playing surfaces of the keys in the first group
    a row of keys in the rear key area comprising keys in a third group and keys in a fourth group, wherein the top playing surfaces of the keys in the fourth group are raised above the top playing surfaces of the keys in the third group
    a first key in the first group;
    a second key in the third group, in substantially the same column as the first key, wherein the first key is wider than the second key;
    a musical pitch value selection means operationally coupled to each of the keys; and
    wherein the first key and the second key select the same pitch.

2. The keyboard of claim 1 wherein there are at least two rows of keys in the front key area, and at least two rows of keys in the rear key area.

3. The keyboard of claim 1, wherein there are at least two rows of keys in the front key area, and a third key and a fourth key in adjacent rows of the front key area, in substantially the same column, select pitches separated by one octave.

4. The keyboard of claim 1, wherein there are at least two rows of keys in the rear key area, and a third key and a fourth key in adjacent rows of the rear key area, in substantially the same column, select pitches separated by one octave.

5. The keyboard of claim 1, wherein a plurality of keys have a rib or tactile guide on the top surface of each key in the plurality of keys.

6. The keyboard of claim 1, wherein there are three rows of keys in the front key area.

7. The keyboard of claim 1, wherein there are three rows of keys in the rear key area.

8. The keyboard of claim 1, wherein there are at least twelve keys in the row in the rear key area, and the at least twelve keys are assigned pitches in an ascending chromatic scale, from left to right.

9. The keyboard of claim 1, wherein the keys in the first group in the row in the front key area are assigned pitches in an ascending major scale, from left to right.

10. The keyboard of claim 9, further comprising a master tuning means, and a root key at the front left corner of the front key area, wherein the musical pitch value selection means will set the pitch of the root key according to a master tuning protocol, and select the pitch of any other key relative to the pitch of the root key.

11. The keyboard of claim 1, further comprising an octave up switch coupled to or on the keyboard, wherein the musical pitch value selection means will select pitches an octave higher for each key, after the octave up switch is actuated.

12. The keyboard of claim 1, further comprising an octave down switch coupled to or on the keyboard, wherein the musical pitch value selection means will select pitches an octave lower for each key, after the octave down switch is actuated.

13. The keyboard of claim 1, wherein there are at least twelve keys in the row in the rear key area, and the at least twelve keys are assigned pitches in an ascending chromatic scale, from left to right, and there are are at least seven keys in the first group in the row in the front key area, and the keys in the first group are assigned pitches in an ascending major scale, from left to right, and there are fewer keys in the row in the front key area than in the row in the rear key area.

14. A keyboard for controlling musical notes, comprising:
    a plurality of keys arranged in at least one row and a plurality of columns in a front key area;

a plurality of keys arranged in at least one row and a plurality of columns in a rear key area;

a row of keys in the front key area comprising keys in a first group and zero or more keys in a second group, wherein the shape or color of keys in the second group, if present, are different than the shape or color of keys in the first group;

a row of keys in the rear key area comprising keys in a third group and keys in a fourth group, wherein the shape or color of keys in the fourth group are different than the shape or color of keys in the third group;

a first key in the first group;

a second key in the third group, in substantially the same column as the first key;

a musical pitch value selection means operationally coupled to each of the keys; and wherein the first key and the second key select the same pitch, and the first key is wider than the second key.

15. The keyboard of claim 14, wherein the keys are depicted as key regions on a touch screen or other input device to a tablet, computer, cell phone, gaming system, or music learning system.

16. A method for performing or recording music, the method comprising:

providing a keyboard with: a plurality of keys arranged in at least one row and a plurality of columns in a front key area, and a plurality of keys arranged in at least one row and a plurality of columns in a rear key area, and a row of keys in the front key area comprising keys in a first group and zero or more keys in a second group, wherein the optional keys in the second group are distinguished by shape, color, height or other key distinguishing means from the keys in the first group, and a row of keys in the rear key area comprising keys in a third group and keys in a fourth group, wherein keys in the fourth group are distinguished by shape, color, height or other key distinguishing means from the keys in the third group, and a first key in the first group, and a second key in the third group, in substantially the same column as the first key select the same pitch, and the first key is wider than the second key providing a means for playing tones or storing musical sequence information in response to key touches on the keyboard pressing keys on the keyboard.

\* \* \* \* \*